April 23, 1957 C. M. CONNELLY 2,790,168
SIGNAL GENERATOR
Filed Feb. 4, 1946
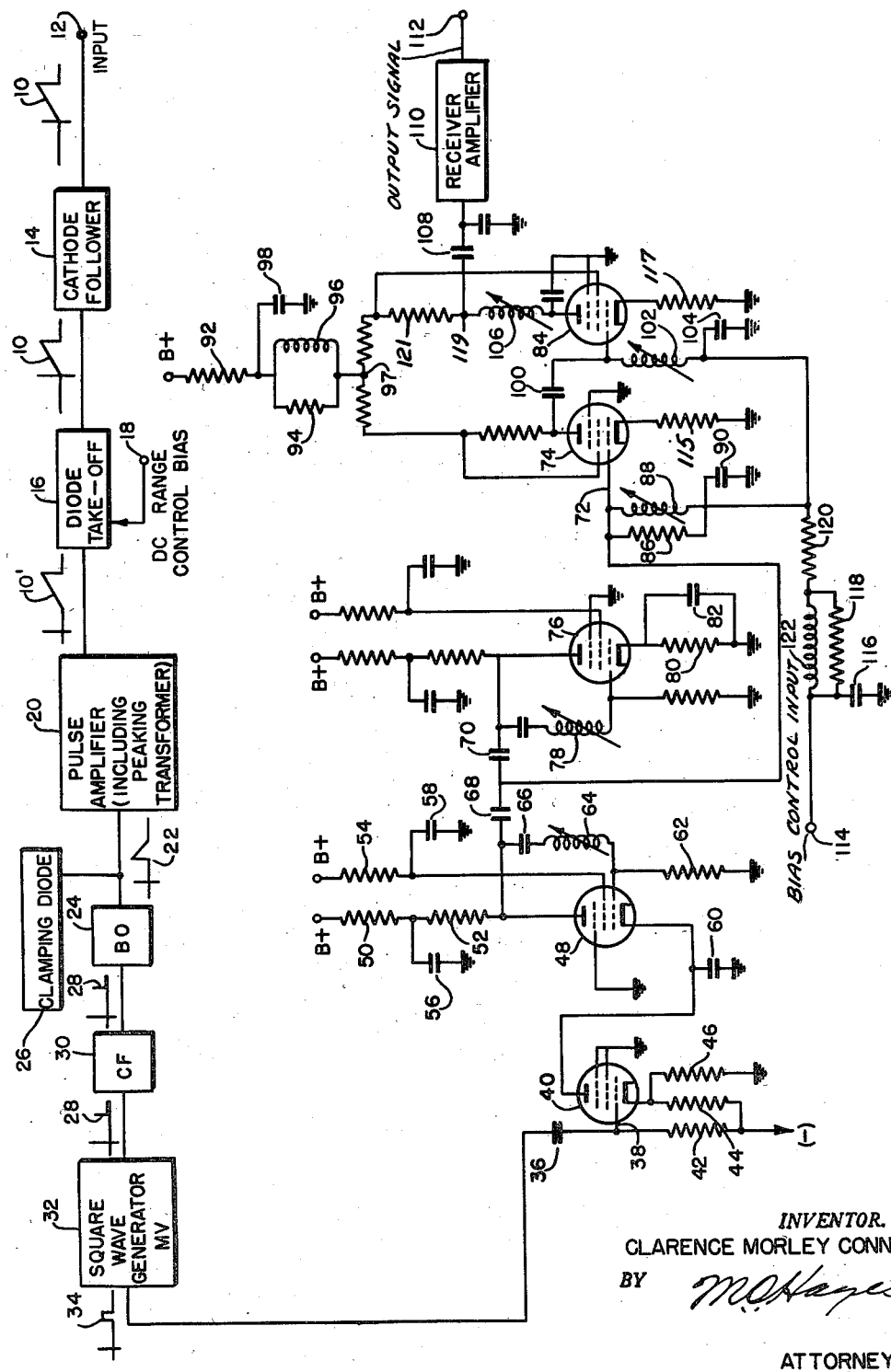
INVENTOR.
CLARENCE MORLEY CONNELLY
BY
ATTORNEY

United States Patent Office

2,790,168
Patented Apr. 23, 1957

2,790,168

SIGNAL GENERATOR

Clarence M. Connelly, Belmont, Mass., assignor, by mesne assignments, to the United States of America as represented by the Secretary of the Navy Application February 4, 1946, Serial No. 645,432

4 Claims. (Cl. 343—17.7)

This invention relates to the generation of pulsed signals and more specifically to the generation of simulated target signals in a radar trainer.

It is desirable to provide means for producing artificial targets for use in a radar trainer. For best results it is desired to feed this information into an existing radar set to train the student with the actual equipment controls normally encountered in the operation of the given radar set. The unit herein described is used to produce a simulated target which may be varied in range and amplitude for such a purpose.

Heretofore this has been done by pulsing an oscillator at the frequency of the intermediate frequency (hereinafter called I. F.) amplifier of the radar receiver and applying the pulses to the said receiver I. F. amplifier. However, this is not very satisfactory because the oscillator has to be pulsed at a high level to obtain accurate pulsing. Accurate low level signals cannot be obtained. Moreover, when the oscillator is pulsed at a high level stray capacitance etc., which exists in the system because the radar I. F. amplifier is located near the oscillator, will couple the oscillator signal directly into the I. F. amplifier. This nullifies the effect of the gain control provided to simulate an antenna energy lobe scanning a target and prevents proper operation of the system since extremely weak signals cannot be obtained.

My invention contemplates and has a specific object the elimination of the hereinabove mentioned problems to provide a means of generating a pulsed signal at a given frequency which pulse may be uniformly controlled in amplitude over a wide range to simulate radar echoes of any desired strength.

Another object of this invention is to provide a means of varying the time at which said pulsed signal will occur after a given trigger or starting point so that said pulsed signals may be fed to a radar receiver and used to simulate a radar target.

This and other objects will be apparent from the following specification when taken with the accompanying drawing which shows all the parts of the invention with the main components shown in detail.

The unit disclosed in this invention consists of a suitable delay network which forms a square wave starting at a variable time after the start of an applied trigger waveform. The said square wave is used to pulse an oscillator which feeds a signal to a mixer stage which also receives a steady signal at a different frequency. The two signals are mixed to produce a pulsed signal at the difference frequency. The pulsed signal so formed may be caried in amplitude over an extremely wide range and is fed to the I. F. amplifier of the radar receiver used in the trainer.

The invention will now be described in detail with reference to the figure. A sawtooth waveform 10 is applied at terminal 12 to cathode follower 14, which in turn applies the same waveform 10 to diode take-off 16. Take-off diode 16 also receives a variable D.-C. bias voltage at terminal 18 which controls the point of conduction, after the start of sweep 10. Diode take-off 16 when conductive passes sawtooth 10′, the remainder of sawtooth 10 beyond the initiation of conduction. Waveform 10′ is applied to a pulse amplifier and peaking transformer 20 which peaks and inverts the waveform 10′ to give the pulse 22 which is applied to blocking oscillator 24. Clamping diode 26 operates to return the output point of pulse amplifier 20 to the same voltage level between pulses. Blocking oscillator 24 provides a positive pulse 28 which occurs at the same time as pulse 22 starts. The pulse 28 is applied through cathode follower 30 to the square wave generator 32 which puts out a square pulse 34 of the desired time duration, 5 or 20 microseconds for example. The pulse 34 couples through capacitor 36 to the grid 38 of switch tube 40. Switch tube 40 is normally cut off by the bias arrangement of the grid and cathode resistors 42, 44, and 46 coupled to a negative power source as shown. Tube 40 is in the cathode circuit of oscillator tube 48. Thus when switch tube 40 is off, oscillator tube 48 is cut-off and there will not be any output from the oscillator. Oscillator 48 is a conventional Colpitts oscillator. Plate voltage is obtained from B+ through resistances 50 and 52. Resistance 54 serves as a screen dropping resistor and the capacitors 56, 58 and 60 serve as decoupling capacitors. Resistance 62 serves as a grid bias resistor. Inductance 64 and capacitor 66 make up the oscillator circuit in conjunction with the tube inter-electrode capacitances. The oscillator 48 is tuned to oscillate at a high frequency, for example 45 megacycles. As already described the tube will not oscillate while the switch tube 40 is cut-off. When tube 40 conducts it acts as a very low cathode impedance for tube 48 which oscillates as long as switch tube 40 conducts. Since switch tube 40 conducts only when a square pulse 34 is applied oscillator 40 will operate in pulses also. The pulsed 45 mc. signal thus developed is coupled through capacitor 68 to the grid 72 of mixer and pre-amplifier tube 74.

Oscillator tube 76 and its associated elements constitute another Colpitts oscillator quite similar to oscillator 48. The only differences are that the inductance 78 is tuned to a higher frequency, 60 mc. for example, and the cathode connects to ground through cathode resistance 80 and by-pass capacitor 82. This permits continuous operation of the oscillator instead of pulsed operation as in the oscillator 48. The 60 mc. signal developed is couple dthrough capacitor 70 to the grid 72 of mixer and pre-amplifier tube 74. The pulsed 45 mc. signal and the steady 60 mc. signal are combined in tube 74 to produce a pulsed signal at the difference frequency 15 mc. which is the tuned frequency of the receiver I. F. amplifier.

Tube 74 serves as a mixer and pre-amplifier tube, which develops the 15 mc. signal from the two applied signals, and then amplifies the said 15 mc. signal. Loading resistance 86, and inductance 88 which is tuned to 15 mc. are connected in parallel to the grid of tube 74 and capacitor 90 serves as a decoupling capacitor. Tubes 74 and 84 obtain their plate voltage at point 97 from B+ through a decoupling network composed of resistances 92 and 94, inductance 96 and capacitor 98, and suitable dropping resistances.

A signal to control the bias and thus the gain of tubes 74 and 84 to simulate the action of the lobe pattern of a directional antenna as the antenna scans a target is applied at terminal 114 through the decoupling network composed of resistances 118 and 120, inductance 122, and capacitor 116 to the grid circuit of each pre-amplifier tube 74 and 84. This bias changing signal is such that it will increase the gain of the mixer and pre-amplifier tube 74 and 84 over a wide range for a period equal to the time the lobes of an actual radar antenna are directed at a given target. Thus if an antenna were stopped on a target the said bias signal would be constant and if the antenna were scanning the said bias would increase periodically as the antenna passed the target.

The cathode resistances 115 and 117 of the pre-amplifier tubes 74 and 84 are unbypassed to get a more linear response from the stages. This causes some degeneration but the extra linearity obtained compensates for this.

The 15 mc. signal output of tube 74 is coupled through capacitor 100 to the grid input circuit of tube 84. Inductance 102 is tuned to 15 mc. and capacitor 104 which connects from inductance 102 to ground acts as a decoupling capacitor. The amplified 15 mc. signal is taken off at point 119 between resistance 121 and matching inductance 106 in the plate circuit of tube 84. The output signal is coupled through capacitor 108 to the radar I. F. amplifier 110. Here the pulse is detected to form a video signal which is taken out at terminal 112 and fed to the indicators not shown in the drawing.

The arrangement employing two oscillators 48 and 76 permits accurate pulsing of the oscillator 48 to obtain an accurate 15 mc. signal for the receiver I. F. amplifier. It will be noted that a single oscillator operative at the same frequency as the I. F. may not be pulsed accurately at as low a level as is required to simulate very weak target echoes.

In accordance with the principles disclosed in this invention neither oscillator 48 and 76 will couple into the intermediate frequency amplifier 110 due to the frequency differences, and the pulsed oscillator 48 may be operated at a high level to obtain satisfactory pulsing. The input to I. F. amplifier 110 is a low level 15 mc. signal, which can be amplified over a wide range as desired, and which will not couple undesirably into the I. F. amplifier 110 to cause improper operation of the signal unit even if the I. F. amplifier 110 and the oscillators and mixer are adjacent to each other.

Although the oscillator circuits 76 and 48 are described herein as operating at 60 mc. and 45 mc. respectively to obtain 15 mc. signals it will be understood that this need not be the case in actual use and the invention should not be limited to those frequencies.

It will be apparent that while I have shown and described my invention in a preferred form changes may be made in the circuits disclosed without departing from the spirit of the invention as sought to be defined in the following claims.

What is claimed is:

1. Electrical trainer apparatus for generating a simulated radar target echo pulse signal for a radar receiver, said signal being at the intermediate frequency of said radar receiver, said trainer apparatus comprising, means for generating an electrical pulse at a time within predetermined limits, an electron tube mixer circuit of adjustable gain, a first high frequency oscillator for generating a continuous electrical signal at a first frequency, a second high frequency oscillator generating a signal at a second frequency, a switch tube in circuit with said second oscillator, said switch tube and said second oscillator being normally non-conductive, means for applying said generated electrical pulse to said switch tube, said switch tube conducting for the duration of said pulse and rendering operative said second oscillator for the time duration of said electrical pulse, said first and second oscillators being coupled to said mixer, said mixer providing in the output circuit thereof said simulated target echo signal at said receiver intermediate frequency, said simulated signal being at the difference frequency of said first and second oscillators, and being variable over a wide range of amplitude, said first and second oscillator output signals having substantially no direct effect upon said radar receiver.

2. Apparatus as in claim 1, including an amplifier, said amplifier being energized by said simulated target signal, and means for varying the gain of said amplifier and said mixer circuit in accordance with a signal for simulating a radar antenna scanning a target.

3. Apparatus for providing simulated radar echo target signals to a radar receiver comprising, a generator of square waves, means for varying the time of initiation of said square waves, means for varying the duration of said square waves, a first oscillator for generating a first frequency output, a switch tube connected between said square wave generator and said first oscillator normally rendering said first oscillator inoperative, said switch tube upon application of pulses from said square wave generator permitting operation of said first oscillator, a second oscillator in continuous operation at a second frequency, a mixer having the periodic output of said first oscillator and the continuous output of said second oscillator applied thereto and providing a pulsed output of a frequency equal to the difference between said first and said second frequencies to said radar receiver, an amplifier driven by the pulsed output of said mixer, and means for controlling the gain of said mixer and said amplifier in accordance with an externally applied signal.

4. Apparatus as in claim 3 wherein said square wave generator comprises a multivibrator and said means for varying the time of initiation of said square waves includes a blocking oscillator providing an output signal to which said multivibrator is responsive.

References Cited in the file of this patent

UNITED STATES PATENTS

| | | |
|---|---|---|
| 2,361,437 | Trevor | Oct. 31, 1944 |
| 2,406,316 | Blumlein | Aug. 27, 1946 |
| 2,420,211 | Tourshou | May 6, 1947 |
| 2,421,016 | Deloraine | May 27, 1947 |
| 2,433,681 | Blumlein | Dec. 30, 1947 |
| 2,468,097 | Moore | Apr. 26, 1949 |
| 2,477,485 | Jacob | July 26, 1949 |